United States Patent
Hudson et al.

(10) Patent No.: US 9,319,424 B2
(45) Date of Patent: Apr. 19, 2016

(54) METHODS AND SYSTEMS FOR COMPLYING WITH NETWORK SECURITY REQUIREMENTS

(71) Applicant: FoxGuardSolutions, Inc., Christiansburg, VA (US)

(72) Inventors: Scott Hudson, Roanoke, VA (US); Paul Monta Elkins, Christiansburg, VA (US); Steven Wirt, Christiansburg, VA (US); Benjamin Sandbrook, Christiansburg, VA (US); Christopher Bateson, Blue Ridge, VA (US); Michael K. Trautman, Christiansburg, VA (US); Jonathan Couch, Christiansburg, VA (US)

(73) Assignee: CCS-Inc., Christiansburg, VA (US)

(*) Notice: Subject to any disclaimer, the term of this patent is extended or adjusted under 35 U.S.C. 154(b) by 38 days.

(21) Appl. No.: 14/307,939

(22) Filed: Jun. 18, 2014

(65) Prior Publication Data
US 2014/0373161 A1    Dec. 18, 2014

Related U.S. Application Data

(60) Provisional application No. 61/836,402, filed on Jun. 18, 2013.

(51) Int. Cl.
*H04L 29/00* (2006.01)
*H04L 29/06* (2006.01)

(52) U.S. Cl.
CPC .................. *H04L 63/1433* (2013.01)

(58) Field of Classification Search
CPC .................................. H04L 63/1433
See application file for complete search history.

(56) References Cited

U.S. PATENT DOCUMENTS

| | | | |
|---|---|---|---|
| 2005/0257267 A1* | 11/2005 | Williams | ............ H04L 63/1408 726/25 |
| 2008/0163373 A1 | 7/2008 | Maynard | |
| 2008/0263666 A1 | 10/2008 | Keohane et al. | |
| 2010/0115601 A1* | 5/2010 | Brandstetter | ......... G06F 21/577 726/11 |
| 2012/0151595 A1* | 6/2012 | McClure | ................ G02B 6/105 726/25 |
| 2012/0185945 A1 | 7/2012 | Andres et al. | |

* cited by examiner

*Primary Examiner* — Brandon Hoffman
*Assistant Examiner* — Helai Salehi
(74) *Attorney, Agent, or Firm* — New River Valley IP Law, P.C.; Michele L. Mayberry; Timothy D. Nolan

(57) ABSTRACT

The present invention provides for methods and systems for complying with network security requirements, particularly those defined by NERC CIP. In particular, the invention provides for methods and systems for identifying a set of network security risks on a computing device, refining the set of network security risks requiring documentation as defined by the requirements, creating documentation on the necessity of the network security risks, and creating a report comprising a listing of the refined set of network security risks and documentation for auditing and compliance purposes.

20 Claims, 17 Drawing Sheets

Configured Firewall Profile

| Profile | Enabled | Policy |
|---|---|---|
| Domain | X | BlockInbound,AllowOutbound |

Ports and Services:

| Port | IP Ver | Local IP | RPC Service | Service / Executable | Required | Can't Remove | Reason / Mitigation |
|---|---|---|---|---|---|---|---|
| TCP 135 | v6 | [::] | | RpcSs (svchost.exe) | | X | because I said so |
| TCP 135 | v4 | 0.0.0.0 | | RpcSs (svchost.exe) | | X | because I said so |
| TCP 139 | v4 | 192.168.1.26 | | system | | X | because I said so |
| TCP 139 | v4 | 192.168.250.82 | | system | | X | because I said so |
| TCP 139 | v4 | 192.168.56.1 | | system | | X | because I said so |
| TCP 445 | v6 | [::] | | system | | X | because I said so |
| TCP 445 | v4 | 0.0.0.0 | | system | | X | because I said so |
| TCP 1801 | v6 | [fe80::489:cd2:adcb:39fc%19] | | {mqsvc.exe} | | X | because I said so |
| TCP 1801 | v6 | [fe80::a454:bbb0:1bac:23c1%40] | | {mqsvc.exe} | | X | because I said so |
| TCP 1801 | v6 | [fe80::c87:e09:af64:5adc%21] | | {mqsvc.exe} | | X | because I said so |
| TCP 1801 | v4 | 172.16.10.133 | | {mqsvc.exe} | | X | because I said so |
| TCP 1801 | v4 | 192.168.56.1 | | {mqsvc.exe} | | X | because I said so |
| TCP 1801 | v4 | 192.168.6.203 | | {mqsvc.exe} | | X | because I said so |
| TCP 2103 | v6 | [::] | | {mqsvc.exe} | | X | because I said so |
| TCP 2103 | v4 | 0.0.0.0 | | {mqsvc.exe} | | X | because I said so |

FIG. 17B

METHODS AND SYSTEMS FOR COMPLYING WITH NETWORK SECURITY REQUIREMENTS

CROSS-REFERENCE TO RELATED APPLICATIONS

The present application relies on the disclosure of and claims priority to and the benefit of the filing date of U.S. Provisional Application No. 61/836,402, filed Jun. 18, 2013, the disclosure of which is hereby incorporated by reference herein in its entirety.

BACKGROUND OF THE INVENTION

1. Field of the Invention

The present invention is related to the field of bulk power system management. More specifically the current invention is related to systems and methods of complying with network security requirements according to NERC Critical Infrastructure Protection (CIP) regulations to protect bulk power systems.

2. Description of Related Art

A computer network is a network of data processing nodes that are interconnected for the purposes of data communication. A computer network can comprise two or more computers and a set of network hardware interconnected by communications channels that allow sharing of resources and information. Organizations rely on computer networks so that two or more separate computer users can communicate using emails, instant messages, video conferencing, etc., share information such as files and data, or access distributed computing resources on other computers of the network. While organizations typically have their own internal network (local area network (LAN) such as an intranet), the necessity of communicating information outside the organization carries an inherent vulnerability in that it is possible to access or exploit these networks by malicious entities outside the organization without appropriate safeguards. Vulnerabilities in computer network security include malicious code such as viruses, worms, and Trojan horses as well as open communication routes, all of which may allow individuals, groups of individuals, or programs to gain unauthorized access to the network. This access can result in damaged files, infection of multiple computers throughout the network, stealing of confidential information, or denial-of-service attacks.

Communications gateways on computing devices within a computer network are referred to as ports. A port is a logical data connection that can be used to exchange data between computers. Each port is specific to a particular application, process, or service running on the computing device, and allows a computing device on the network to access that particular application, process, or service, thus providing a door or gateway that serves as a physical connection for the application etc. Like a door, a port may be open or closed. An open port on a computer is a port associated with an application, process, or service that is available for access by another computer on the network. A port that is closed is not associated with any application etc. that is available for access. Communications protocols employ both the IP address of the computer that is to be accessed, as well as a specific port number, a 16-bit number that is specific for each application etc. to route data packets first to the target computer, then the target application. Port numbers range from 0 to 65,536, and are assigned by the International Assigned Numbers Authority (IANA). Sockets are endpoints in a bidirectional communication that use IP address and port number to distribute data packets in the communication to the correct application. Services are system processes that support the running of a particular program.

Exploitation of open ports is a standard method that computer hackers use to gain unauthorized access to particular applications. Hackers can identify open ports on a computer by systemically scanning the target computer to determine which are open and which are closed. This involves sending a connection request to a range of port addresses on a target computer, with the purposed of identifying active ports that are associated with an application with one or more vulnerabilities that may be exploited. Thus, from a network security standpoint, it is desirable to limit the number of active ports on a computer to those that are only necessary for critical applications, processes, and services. Computer network administrators employ software called ports and services scanners that probe computers on the network for open ports. However, existing software has limitations in that it often scans only the most common port numbers, or those ports that have been identified as associated with the most vulnerable services. Further, inaccuracies in port scanning software exist that result in some ports being falsely identified as potentially running vulnerable services, and these false positives severely limit the ability to determine the true vulnerability of the network.

The United States electrical grid as well as the power grids of other countries have been increasingly recognized as vulnerable to cyber attack. A case-in-point are Supervisory Control and Data Acquisition (SCADA) systems that are used to control equipment in electric power companies as well as manufacturing facilities, water treatment plants, and nuclear power facilities. The Stuxnet computer worm, designed by U.S. and Israeli intelligence agencies, was created to target Siemens SCADA systems controlling Iranian nuclear enrichment facilities, and similar SCADA systems used in large public power companies are integrated with networks with direct links to the internet. U.S. intelligence agencies have detected numerous intrusions in electrical grid infrastructure by hackers based in China, Russia, and other countries. In 2010, the Department of Homeland Security created special teams as part of an Industrial Control Systems Computer Emergency Response Team (ICS CERT) to assess industrial control systems at U.S. power plants for network vulnerability.

Further, the North American Electric Reliability Corporation (NERC), a nonprofit governmental agency that regulates power companies in the United States, has established numerous regulations including Critical Infrastructure Protection (CIP) requirements that govern proper network security protocols and procedures at power plants. Included in these regulations is the requirement that only ports and services necessary for operations are enabled, and unnecessary ports and services are disabled. NERC CIP standards define requirements for ports and services used within networks in bulk power systems. For example, Requirement 2.2 (R 2.2) in Standard CIP-005-3 states the following:

At all access points to the Electronic Security Perimeter(s), the Responsible Entity shall enable only ports and services required for operations and for monitoring Cyber Assets within the Electronic Security Perimeter, and shall document, individually or by specified grouping, the configuration of those ports and services.

Similarly, Requirement 4.2 of the same document requires an annual review to verify that only ports and services required for operations at electronic access points to the Electronic Security Perimeter are enabled.

Further, for example, NERC standard CIP-007-3 further defines ports and services requirements as defined below:

R2. Ports and Services—The Responsible Entity shall establish, document and implement a process to ensure that only those ports and services required for normal and emergency operations are enabled.

R2.1. The Responsible Entity shall enable only those ports and services required for normal and emergency operations.

R2.2. The Responsible Entity shall disable other ports and services, including those used for testing purposes, prior to production use of all Cyber Assets inside the Electronic Security Perimeter(s).

R2.3. In the case where unused ports and services cannot be disabled due to technical limitations, the Responsible Entity shall document compensating measure(s) applied to mitigate risk exposure.

Similarly, Requirement 8 of NERC standard CIP-007-3 requires an annual review to verify that only ports and services required for Cyber Assets within the Electronic Security Perimeter are enabled.

Additional information on NERC-CIP requirements for Ports and Services can be found in the Appendix, and in the following documents, each of which are incorporated by reference herein in their entireties: "Reliability Standards for the Bulk Electric Systems of North America," published by NERC, and "NERC CIP Compliance," published by Midwest Reliability Organization, a regional electric reliability council under NERC authority. Further, the Bureau of Reclamation has developed a manual for compliance with NERC CIP 005-R2.2 and CIP 007-R2, which may be helpful for further understanding these requirements. This is also included in the Appendix and incorporated by reference herein in its entirety.

Thus, existing NERC CIP requirements require power plant operators to document the configuration of those ports and services required for operations, evidence to show that only ports and services required for operations are enabled, as well as measures to mitigate risk when unused ports and services cannot be disabled. As described above, the CIP standards exist to ensure critical systems are not at risk, or are at limited risk, of potential viruses and systems hacks. However, existing "ports and services" scanners are sub-optimal for compliance with NERC CIP requirements in part due to the aforementioned limitations and in part due to the fact that these scanners are not integrated with documentation or list management functions. The current methods of compliance require separate applications for each of these functions, making the work tedious and inefficient in documenting scanned results and making necessary changes for compliance.

In addition, another source of difficulty is that ports and services must be identified and minimal ports and services determined according to the NERC CIP definitions, which often differ from information technology (IT) industry standard definitions. This lack of uniformity requires constant monitoring to ensure a system or systems comply with the differing definitions and continually meet the definitions set by NERC CIP. Therefore, there exists a need to provide a scan to both meet the specified security requirements and provide an efficient means of documenting performed scans and reporting the results in relation to the NERC standards.

SUMMARY OF THE INVENTION

The present invention addresses issues commonly found in the prior art by providing an efficient and accurate means of complying with network security requirements defined by NERC CIP standards such that the work load of network administrators who must comply with these standards is significantly reduced.

One embodiment of the invention includes a method of complying with network security requirements for a computing device, comprising identifying a set of network security risks on the device, refining the set of network security risks to those requiring documentation as defined by the requirements (such as NERC requirements), creating documentation on the necessity of the network security risks, and creating a report comprising a listing of the refined set of network security risks and documentation.

Another embodiment of the invention includes a system for complying with network security requirements for a computing device, comprising an identifying means for identifying a set of network security risks on the device, a list management means for refining the set of network security risks to those requiring documentation as defined by the requirements, a documentation means for creating documentation on the necessity of the network security risks, and a reporting means creating a report comprising a listing of the refined set of network security risks and documentation.

In other embodiments, the present invention provides for methods and systems for scanning a target device for active, open sockets, running services, and firewall settings to create a list of network security risks, refining the list of network security risks into a list of those requiring documentation as defined by network security requirements, documenting the required use of the network security risks, and creating a documentation report for auditing (and other) purposes composed of the refined list and the documentation showing the necessity of those network security risks.

In one aspect, embodiments of methods and systems of the invention use a set of commands on a target computer for scanning.

In another aspect, methods and systems embodiments can use a network port scanner.

In another aspect, methods and systems embodiments can refine the list of network security risks by removing one or more, or all, open sockets that are currently part of an established network connection, removing one or more, or all, sockets that are only accessible from the local host, identifying and marking open sockets with a source port that is non-static, and identifying and grouping services that use multiple listening ports.

Another embodiment of the invention includes a method of complying with network security requirements for a computing device through periodic review, comprising identifying a set of network security risks on the device according to the requirements, storing the set of network security risks in a dataset, comparing the set of network security risks to the device's baseline system requirements, creating a report to display the network security risks that are not included in the device's baseline system requirements, and mitigating the risk of the network security risks that are not included in the device's baseline system requirements. In one aspect, the step of mitigation comprises determining if a port or service is required for operation of the device, and if the device is required, manually editing individual ports or service documentation and adding the port or service to the device's system requirements. In another aspect, the step of mitigation comprises determining if a port or service is required for operation of the device, and if the device is required, selecting groups of ports or services from the ICS System Knowledge Manager and selecting the ICS System from the ICS System Knowledge Manager. In yet another aspect, the step of mitigation comprises determining if a port or service is required for operation of the device, and if the device is not required, manually disabling ports or services or mitigating through the use of a firewall, router, or electronic monitor.

BRIEF DESCRIPTION OF THE DRAWINGS

FIGS. 17A and 17B are screenshots showing a non-limiting example of a Report screen of an embodiment of a Graphical User Interface according to the invention.

DETAILED DESCRIPTION OF VARIOUS EMBODIMENTS OF THE INVENTION

Reference will now be made in detail to various exemplary embodiments of the invention. Embodiments described in the description and shown in the figures are illustrative only and are not intended to limit the scope of the invention, and changes may be made in the specific embodiments described in this specification and accompanying drawings that a person of ordinary skill in the art will recognize are within the scope and spirit of the invention.

As used herein, the terms "device" and "machine" both refer to a networked computing device, and may be used interchangeably.

Embodiments of the current invention provide for both methods and systems of network security compliance as defined by NERC CIP standards. In particular, embodiments of the invention provide for methods and systems for scanning a target device for active, open sockets, running services, and firewall settings to create a list of network security risks, refining the list of network security risks into a list of those requiring documentation as defined by network security requirements, documenting the required use of the network security risks, and creating a documentation report for auditing (and other) purposes composed of the refined list and the documentation showing the necessity of those network security risks.

Figure 1:
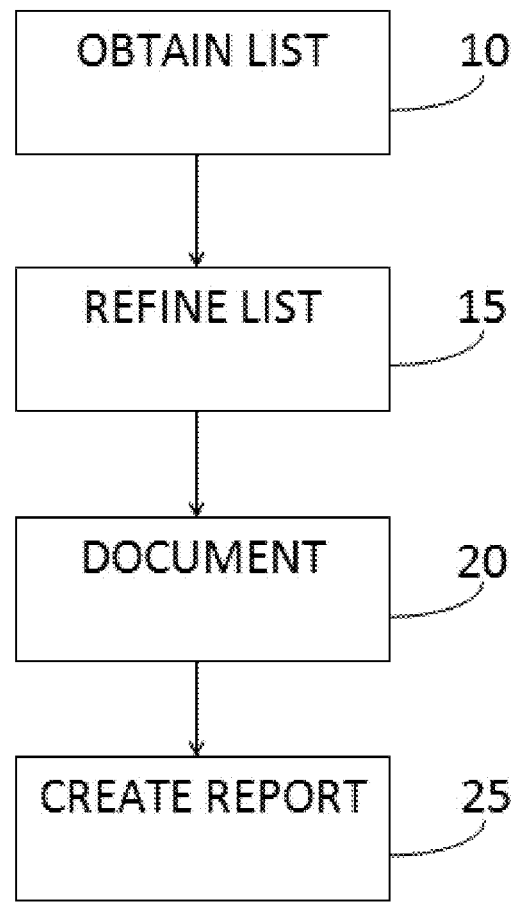
FIG. 1 is a flowchart showing an overview of an embodiment of a method according to the invention.

Referring now to FIG. 1, an overview of an embodiment of a method as performed by a system according to the invention 1 is shown. The system first scans a target computer to obtain a list of active and potential network connections, also referred to as open sockets, and includes running services, and firewall settings 10. The scan may either be a scan of a local computer using the commands on that computer, or a scan of a computer on a network through a network port scanner. This list of open sockets is further refined into a list of ports and services requiring documentation as defined by NERC CIP 15. The required use of ports and services on the refined list is then annotated and/or documented 20. Finally, the system creates a documentation report for auditing (and other) purposes composed of the refined list and the documentation showing the necessity of those ports and services 25.

Figure 2:
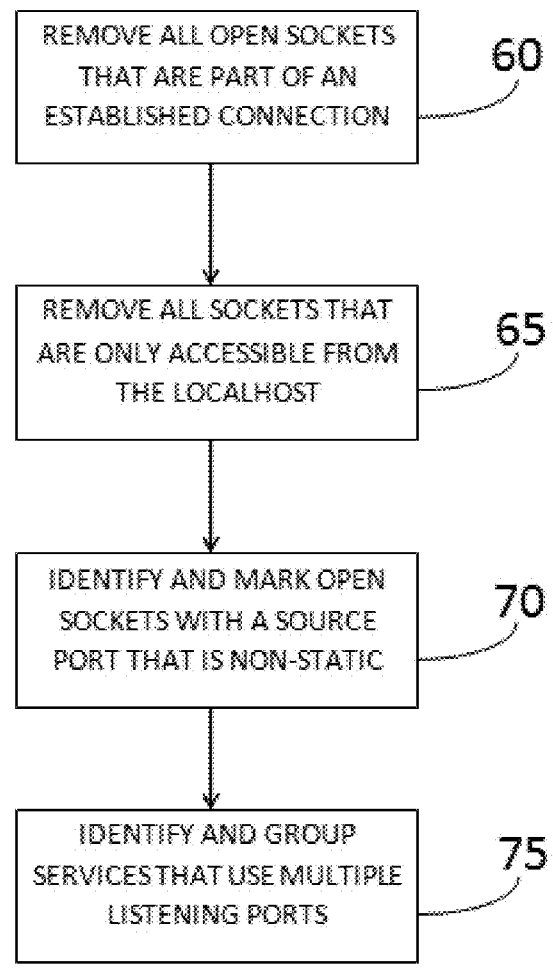
FIG. 2 is a flowchart showing an embodiment of a network security risks refinement process according to the invention.

FIG. 2 shows an embodiment of a network security risks refinement process 50. Once the system has run the scan, a dataset is generated identifying a list of open sockets. The open sockets list, also referred to as the ports and services list, is first refined by removing all open sockets that are not considered a compliance risk, or those that have been previously defined by the system, such as those currently part of an established network connection 60. For example, in Microsoft Windows environments, to determine whether a socket is part of an established network connection, a non-blocking, zero-byte Send call can be made. If the call returns successfully or throws a WAEWOULDBLOCK error code (10035), then the socket is still connected; otherwise, the socket is no longer connected. The ports and services list may be further refined by removing all sockets that are only accessible from the localhost (local computer) 65. The ports and services list may be further refined by identifying and marking open sockets with a source port that is non-static (typically Remote Procedure Call (RPC) ports) 70. This identification is used to match open sockets with documentation where the listening port number is variable. The ports and services list may then be further refined by identifying and grouping services that use multiple listening ports (e.g. Domain Name System (DNS) in a Windows AD environment) for the same service 75.

The process of FIG. 2 is merely exemplary, and the exact order of the steps of the process may be interchangeable as may be recognized by a person of ordinary skill in the art. Further, additional steps may be included and/or one or more step omitted. For example, in other embodiments, step 70 may occur before step 65, or step 65 may occur before step 60. In embodiments, the exact order is not critical, as long as all of the steps in the process are performed. Once the ports and services list has been refined to identify open sockets that were not previously documented or reported, the necessity of those sockets are documented as defined by NERC CIP standards to explain why those ports or services are required, and a documentation report is generated.

The report generated identifies existing ports and services that have not been adequately documented and that may require further action. In one embodiment, reporting is stored so that ports and service documentation status can be reviewed over time. Further, firewall rule reporting may assist in documentation of additional mitigations. The report, or reports, generated may identify and include relevant firewall rules associated with the open sockets. Embodiments of the invention may allow for reports to comprise different documentation sets to be associated with each scan and may further allow reports with new documentation sets to be associated with past scans.

The present invention in embodiments may allow for documentation of the refined ports and services through the use of text fields, check boxes, pull-down menus, and other suitable means. The present invention may allow independent documentation for each port and service as well as independent documentation sets for each scanned machine, and can allow for documentation of ports and services independent of their actual discovery. The system may also provide reference information that can be used to document a specific port and/or service, and may provide reference information that can be used to document groups of ports and services based on machine-use criteria. Such reference information may include vendor documentation that describes the necessity of the specific port(s) or service(s). Further, when documenting the refined ports and services list, the system may include reference information for disabling non-required ports and services, and allow the grouping of scanned machines to associate with a documented list of ports and services.

Figure 3:
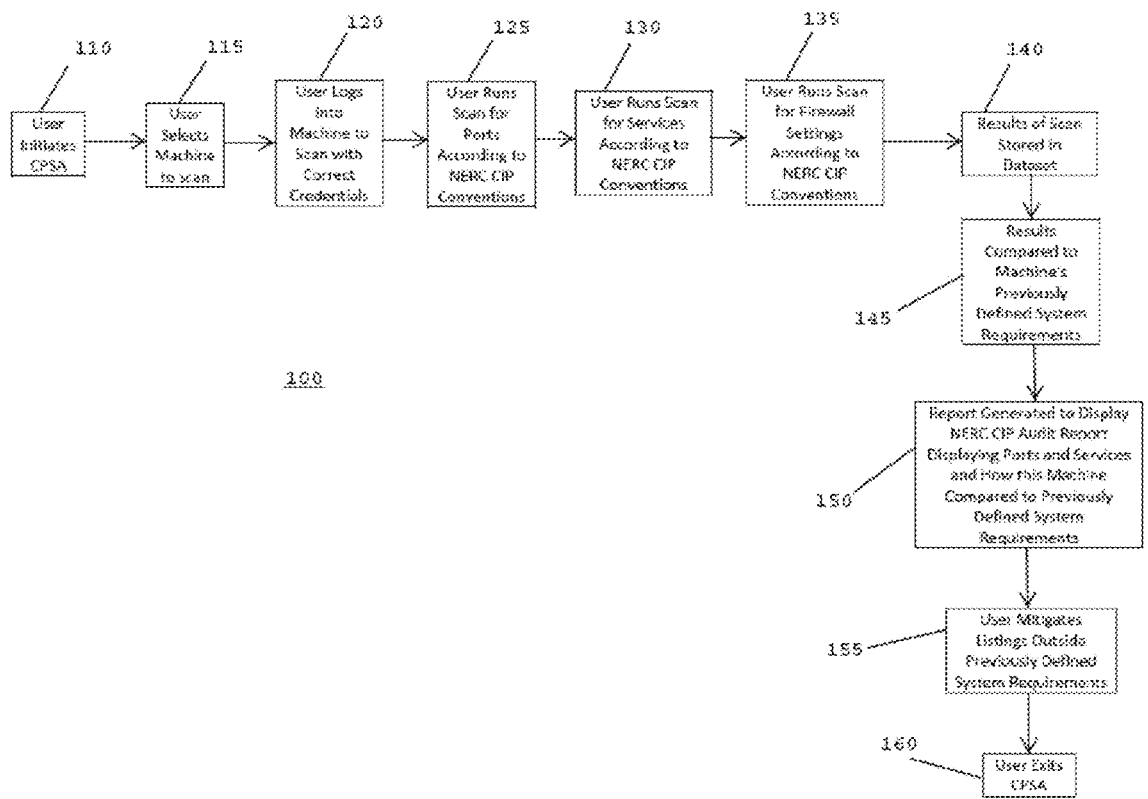
FIG. 3 is a flowchart showing an overview of an embodiment of a periodical review embodiment of a method according to the invention.

NERC CIP standards include requirements for periodic reviews to confirm that only necessary ports and services are enabled. These reviews must be run as required by NERC standards, typically when significant changes are made, including patching. In light of this, some embodiments of the invention include methods of periodic review of ports and services. For example, FIG. 3 shows an overview of an embodiment of a periodical review method of the invention 100. The method may begin with the user initiating the system 110. The user may then select a machine or group of machines to scan 115. Upon initiating the scan the user may log in to the machine with pre-specified credentials 120. Once credentials are verified, scans may be run to determine ports 125, services 130, and firewall settings 135 that are active to later determine their compliance with NERC CIP specified standards. Results of the scan may be stored in a dataset to be later analyzed 140, and the results may be compared to the machine's previously defined system requirements 145, which for purposes of NERC compliance may be considered a baseline list or configuration (see Appendix). After the results are compared, the system may generate a NERC CIP Audit Report 150 displaying ports and services including those outside of previously defined system requirements. After the report is generated, the user may mitigate listings outside previously defined system requirements 155, and then the user exits the system 160. The audit reports may be stored for future action and reference or may be used for mitigation; however, the reports are generally used to mitigate listings outside the previously defined system requirements.

As in FIG. 2, the process shown in FIG. 3 is merely exemplary, and the exact order of steps of the process may be interchangeable, one or more steps may be omitted, or one or more additional steps may be included, as may be recognized by a person of ordinary skill in the art. For example, in some embodiments, the scan for services 130 may be run before the scan for ports 125, or the scan for firewall settings 135 may be run before the scan for services 130. It is understood within the context of this specification that embodiments of the invention include devices and systems capable of implementing any method(s) described herein.

The present invention may allow for any networked machine involved in bulk power system management to be selected for scanning and additionally allows for the rescanning of machines by a group. Scans may also be pre-scheduled and can be run without any installation of files on the scanning computer to further reduce risk of improper operation. The present invention may also scan across different computer platforms in a network and may use careful criteria for network scanning as appropriate in a sensitive network environment. For example, the system may include controls so that only non-intrusive port scans are conducted in order to minimize any potential negative impacts or disruptions of operational systems. Computer platforms that the current invention may scan across include various operating systems such as those provided by Microsoft®, such as the Microsoft Windows® family of operating systems, MacOS® from Apple®, various flavors of UNIX including Linux®, NetBSD, FreeBSD, Solaris®, and the like. Machines and computing devices that may be scanned include any workstations, servers, laptop computers, modems, routers, various handheld devices such as tablets and smartphones, that are connected to a network in a power plant, and most particularly, Industrial Control Systems (ICS) such as supervisory control and data acquisition (SCADA) systems that control power generation equipment.

In one embodiment, computer devices may be scanned using a network port scanner such as Nmap, Nessus, or equivalent tools. Computer devices that are targeted for scanning by a network port scanner will run on one or more IP-based network protocols. Most commonly, the protocol will be TCP/IP and UDP. TCP/IP is a fundamental protocol used for packet-based network communications on local area networks, wide area networks, and global telecommunications networks such as the Internet. UDP (User Datagram Protocol) is an alternative "connectionless" communications protocol that runs above IP (Internet Protocol). UDP lacks the error correction and receipt acknowledgment features of connection-based protocols such as TCP. ICMP (Internet Control Message Protocol) is another extension of IP which permits control communications (most commonly through an ICMP PING request) between hosts on an IP network.

Computers that are the object of a network scan, in one embodiment, are identified by a unique or locally unique IP (Internet Protocol) address, in the case of IPV4 addresses, in the form A.B.C.D, where each of A, B, C and D has a value between 0 and 255. In the case of IPV6, the full notation for an address typically comprises eight groups of four hexadecimal digits, each group separated by a colon, however, such addresses can also be expressed in abbreviated form as well. Typically, the target network is defined by one or more ranges of IP addresses controlled by the target network, but may contain additional target computers or target sub-networks connected to the target network topographically but not part of the predetermined IP range or ranges.

Scanning of a computer on a network may be performed through various types of port scanning. In one embodiment, TCP scanning is used. TCP scanning uses the operating system's various network functions to perform a scan. If a port is open, a brief connection is made with the target computer by completing the TCP three-way handshake, and then the connection is immediately closed. In another embodiment, SYN scanning is used. SYN scanning is a form of TCP scanning, but instead of using the operating system's network functions, the port scanner generates raw IP packets itself called a SYN packet. SYN scanning is also referred to as half-open scanning because a full TCP scan is never opened. A SYN packet is sent to a target computer as if a real connection were intended. A SYN/ACK in response is interpreted as the port is open, while a RST indicates a closed port. Further, in another embodiment, UDP scanning is used. UDP is a connectionless protocol that involves sending a UDP packet to every targeted port on a target computer. If an ICMP port unreachable message is received, it indicates that the port is closed.

In embodiments, scanning can be performed using the netstat, sc query, and netsh commands on a local computer. For example, the netstat command is available on Windows-NT, Unix, and Mac operating systems and will display all active TCP connections. SC query is available on various Windows operating systems and obtains and displays information about specified services. Netsh is available on Windows NT operating systems and allows a user, either locally or remotely, to display or modify the network configuration of a computer that is currently running.

Figure 4:
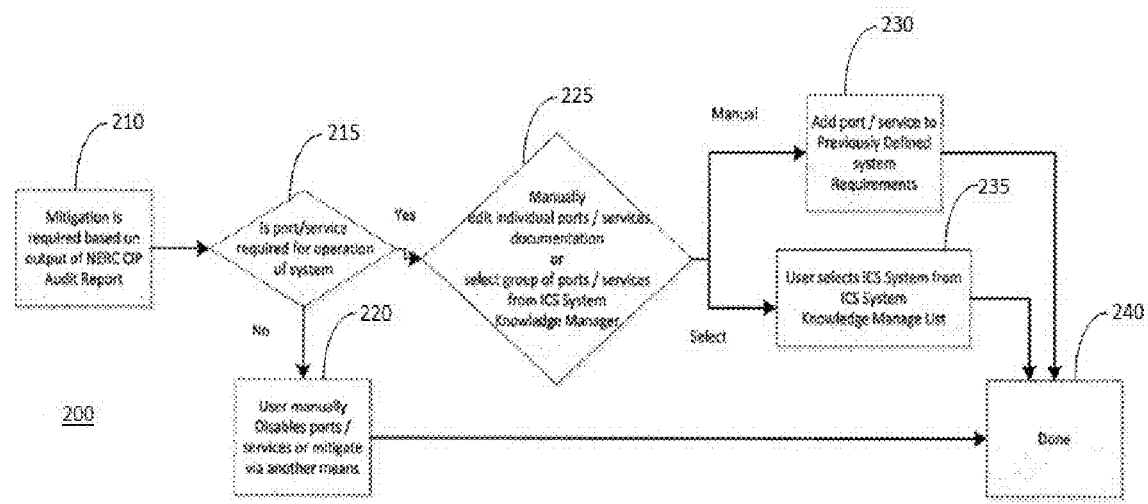
FIG. 4 is a flowchart showing an overview of an embodiment of a mitigation process according to the invention.

Once a report of documented ports and services of the refined open socket list is generated, the system of the invention provides for mitigation of listings outside the previously defined system requirements. FIG. 4 shows an overview of an embodiment of a mitigation process 200 according to the invention. The process begins with the NERC CIP audit report 210, which determines whether mitigation is required. The NERC CIP audit report 210 indicates as to whether a port or service is documented as required or mitigated for the system 215. If the port or service is required, the user may either manually edit individual ports and services documentation or select groups of ports and services from the Industrial Control System (ICS) Knowledge System Manager 225. If the user manually edits documentation, they add the port or service to previously defined system requirements 230. If the user selects ports and services, the user selects the appropriate ICS system from the ICS System Knowledge Manager list 235. After either step is completed, the entire process is considered completed 240. If the port or service is not required, the user manually disables ports and services or mitigates by other means 220, after which the process is completed 240. The Industrial Control System (ICS) Knowledge Manager can be a database that works in conjunction with the invention. The ICS Knowledge Manager may store ports and services definitions for specific ICS systems and allow these to be updated according to the results of the NERC CIP audit report.

Mitigation is necessary to reduce the risk from ports and services that are not required for operation of the system. In embodiments, and for the greatest protection, if a port or service is not required it must be disabled. It can be disabled manually by a user, or automatically by the system if the system recognizes the port/service is not required. Further, in embodiments, if a port or service cannot be disabled due to technical limitations, then it must be mitigated through other means, such as through the use of firewalls or routers to disallow communications to specific ports, or through an electronic monitor for detecting unnecessary traffic or monitoring specific services. If a port or service is required, but has not been documented according to NERC CIP standards as to why it is required, then further explanation and documentation is necessary according to the NERC regulations. The system or user can manually add the required port/service to the previously defined system requirements, or a port/service can be added by selecting a group of ports/services from the ICS System Knowledge Manager.

Figure 5:
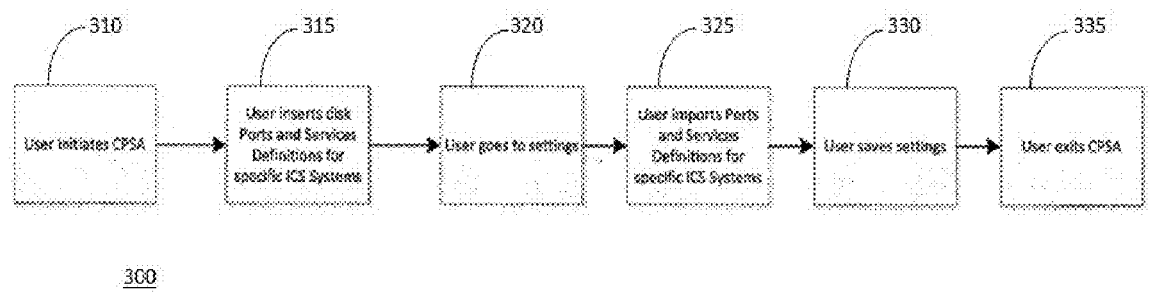
FIG. 5 is a flowchart showing an embodiment of an ICS Knowledge Management process according to the invention.

FIG. 5 shows an overview of an ICS System Knowledge Management process 300 according to the invention. The process begins with the user initiating the system 310. In order for a user to add definitions from the ICS System Knowledge Manager, the user inserts a storage device such as a disk, CD-ROM, or USB flash drive containing Ports and Services Definitions for the specific ICS system 315. The user then accesses the settings 320 and imports the Ports and Services Definitions for the specific ICS system 325 and saves the settings 330. The user then exits the system 335.

Once all open sockets that have been defined as required are documented and once all unrequired ports and services have been disabled, the determination of NERC CIP compliance is complete and the system of the current invention is exited by a user, or done so automatically.

The systems of the invention may include software such that it comprises a group of computer-executable instructions embedded in computer hardware that may be organized into routines, subroutines, procedures, objects, methods, functions, or any other organization of computer-executable instructions that is known or becomes known to a skilled artisan in light of this disclosure, where the computer-executable instructions are configured to direct a computer to perform one or more of the specified tasks of the invention. The computer-executable instructions can be stored contiguously or non-contiguously and can be stored and executed on a single computer or distributed across multiple computers. A skilled artisan will further appreciate, in light of this disclosure, how such a system can be implemented, in addition to software, using hardware or firmware. As such, as used herein, the tasks of the invention can be implemented in a system comprising any combination of software, hardware, or firmware. Computer-executable instructions may preferably be written in platform-independent programming languages such as Java™.

Further, in another embodiment, methods and systems of the invention may be carried out through or include various databases wherein datasets and information such as lists of ports and services and their documentation are stored. As used herein, the term "database" is a broad term that encompasses its ordinary meaning and includes, without limitation, any grouping of data stored in a computer-readable format, whether the data is stored on a disk drive, in Random Access Memory ("RAM"), as Read Only Memory ("ROM"), or the like. Software for performing individual tasks may interact with various databases. For example, one set of computer-executable instructions for performing a scan may include instructions for storing the results of that scan into a database. Another set of computer-executable instructions may include a compare function to compare the results of a scan stored in one database to previously defined system requirements stored in another database. Further, another set of computer-executable instructions may be used to store and retrieve a list of ports and services definitions. Another set of computer-executable instructions may be used to retrieve or edit ports and services documentation stored in another database. A skilled artisan will appreciate various methods in which computer-executable instructions and databases may be used together to perform the tasks of the invention.

Further, in another embodiment, methods and systems of the invention may be carried out through or include a graphical user interface which may be used in conjunction with the computer-executable code and databases. For example, the graphical user interface may be used to permit a user to define a scanning job such as selecting a machine to scan, log into a machine to scan, perform and display the results of a scan, and edit and refine a list of ports and services and their documentation. The graphical user interface may allow a user to perform these tasks through the use of text fields, check boxes, pull-downs, command buttons, and the like. For example, text fields may be used to enter specific documentation as to why a port or service is required. Check boxes and command buttons may be utilized for refining lists of ports and services, such as checking of a box next to a port removes a port from the list after a command button labeled "Remove" is clicked upon. A pull-down menu may be utilized for the user to initiate functions such as saving documentation or creating a report. A skilled artisan will appreciate how such graphical features may be implemented for performing the tasks of the invention.

Such graphical controls and components are reusable class files that are delivered with a programming language. For example, pull-down menus may be implemented in an object-oriented programming language wherein the menu and its options can be defined with program code. Further, some programming languages integrated development environments (IDEs) provide for a menu designer, a graphical tool that allows programmers to develop their own menus and menu options. The menu designers provide a series of statements behind the scenes that a programmer could have created on their own. The menu options may then be associated with an event handler code that ties the option to specific functions. Text fields, check boxes, and command buttons may be implemented similarly through the use of code or graphical tools. A skilled artisan can appreciate that the design of such graphical controls and components is routine in the art.

Figure 6:
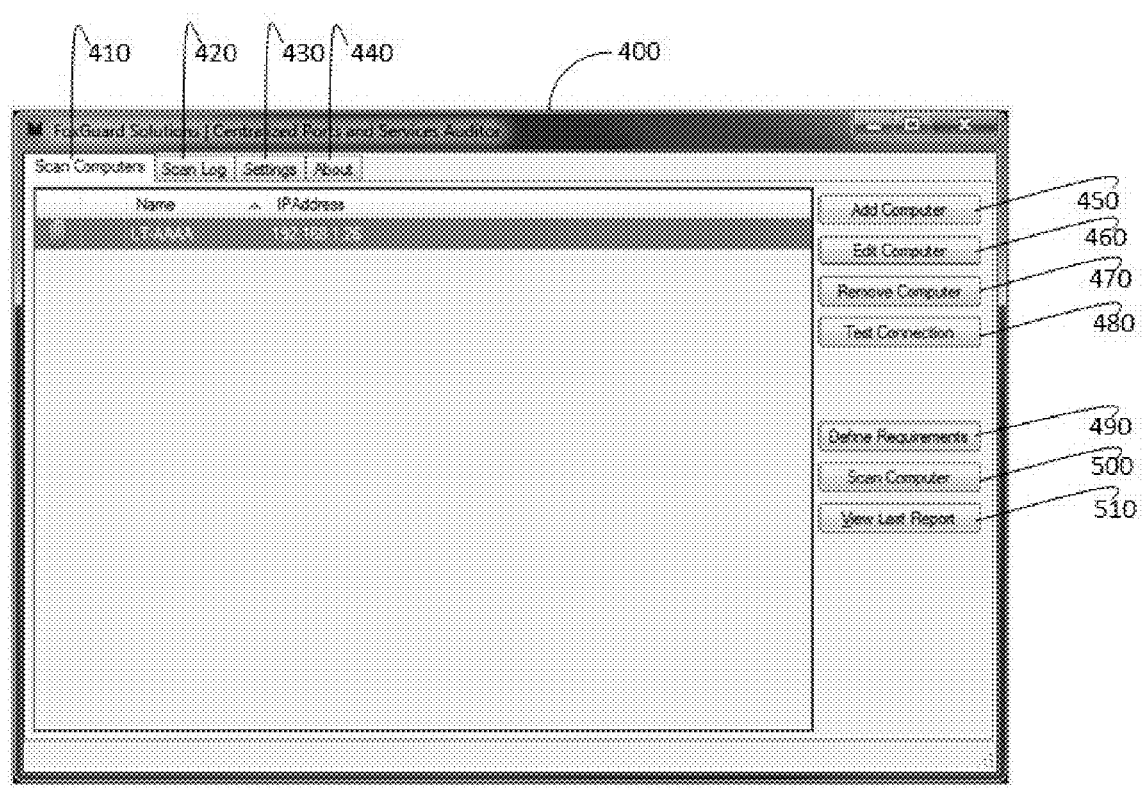
FIG. 6 is a screenshot showing a non-limiting example of a Main Form screen of an embodiment of a Graphical User Interface according to the invention.
Figure 7:
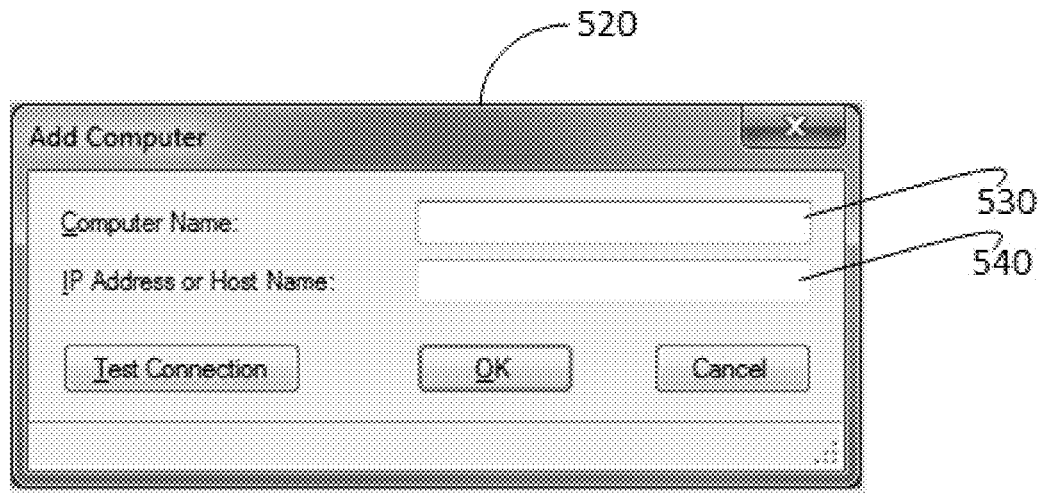
FIG. 7 is a screenshot showing a non-limiting example of an Add Computer screen of an embodiment of a Graphical User Interface according to the invention.
Figure 8:
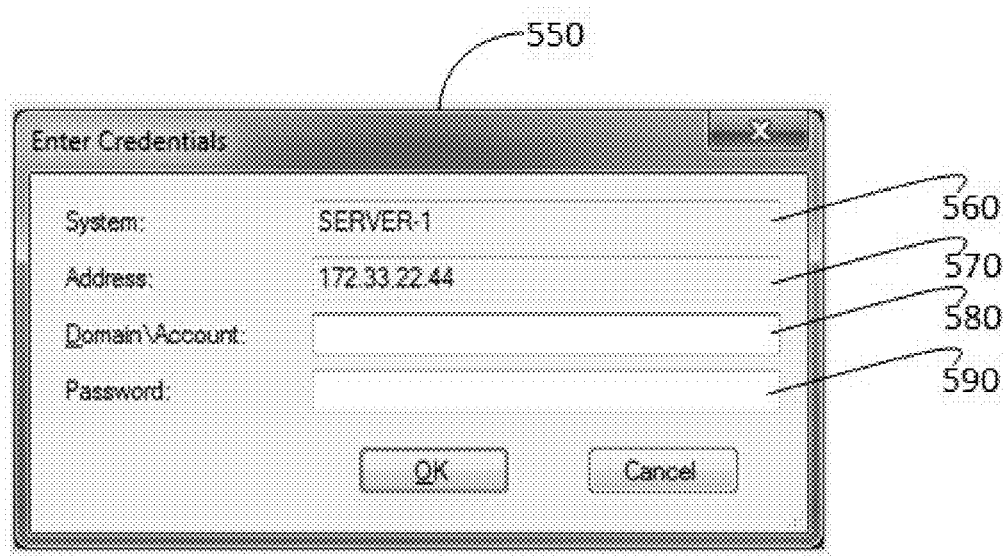
FIG. 8 is a screenshot showing a non-limiting example of an Enter Credentials screen of an embodiment of a Graphical User Interface according to the invention.

Reference will now be made to the following figures which illustrate various aspects of embodiments of a graphical user interface (GUI) of the invention in the form of screen shots. As shown in the non-limiting example of FIG. 6, an embodiment of the GUI of the invention may comprise a Main Form 400, which may comprise one or more of the following tabs: Scan Computers 410, Scan Log 420, Settings 430, and About 440. Further, on the Scan Computers tab 410, the main form 400 may comprise the following buttons: Add Computer 450, Edit Computer 460, Remove Computer 470, Test Connection 480, Define Requirements 490, Scan Computer 500, and View Last Report 510. Upon clicking the Add Computer button 450, an Add Computer screen 520, and shown in FIG. 7, may appear. The Add Computer screen 520 may further comprise a field for Computer Name 530 and IP Address or Host Name 540, so that a computer may be added for scanning. The Add Computer screen may also include buttons such as Test Connection, OK, and Cancel. Upon entering these fields, an Enter Credentials screen 550 may appear, as shown in FIG. 8. The Enter Credentials screen 550 may comprise one or more of the following fields: System 560, Address 570, Domain\Account 580, and Password 590, so that appropriate credentials may be entered. The Enter Credentials screen may include buttons such as OK and Cancel.

Figure 9:
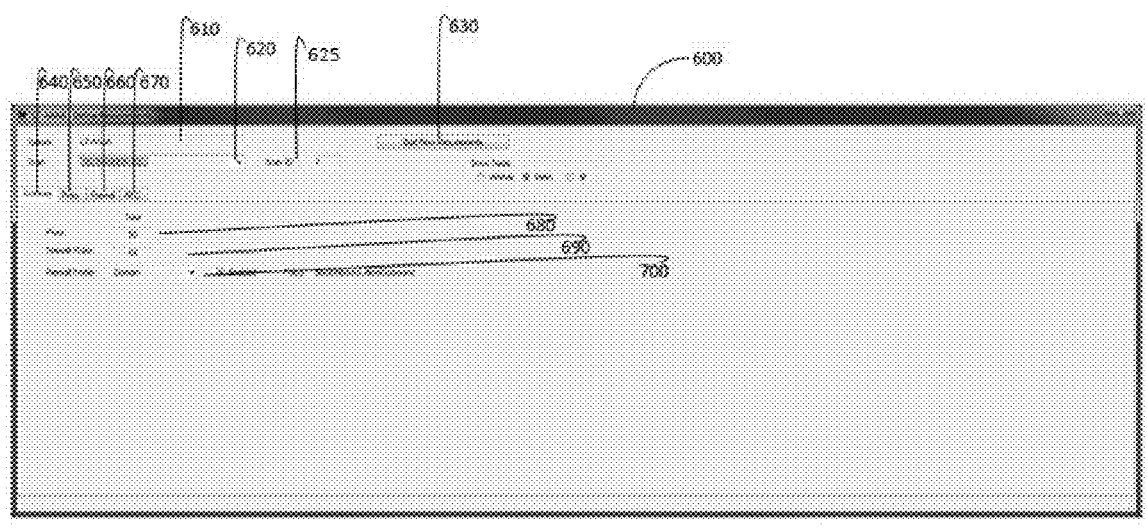
FIG. 9 is a screenshot showing a non-limiting example of a Define Requirements screen of an embodiment of a Graphical User Interface according to the invention wherein the Summary tab is open.

Upon clicking the Define Requirements 490 button on the Main Form 400, a Define Requirements screen 600 may appear, a non-limiting example of which is shown in FIG. 9 with the Summary tab 640 open. The Define Requirements screen 600 may include a field for the System 610, which may be the particular computer that was scanned, Scan 620, which may be a pull-down menu as shown and may show the date and time of the displayed scan, Scan ID 625 of the displayed scan, as well as a button to Start New Requirements 630. The Define Requirements screen may include the following tabs: Summary 640, which summarizes the total number of ports and firewall rules resulting from the displayed scan, as well as tabs for Ports 650, Firewall 660, and RPC 670 so that requirements may be defined for these. The Summary tab 640, shown in FIG. 9, may include one or more of the following fields: Ports 680 and Firewall Rules 690, which display a total number, and Firewall Profile 700, which may be a pull-down menu as shown.

Figure 10:
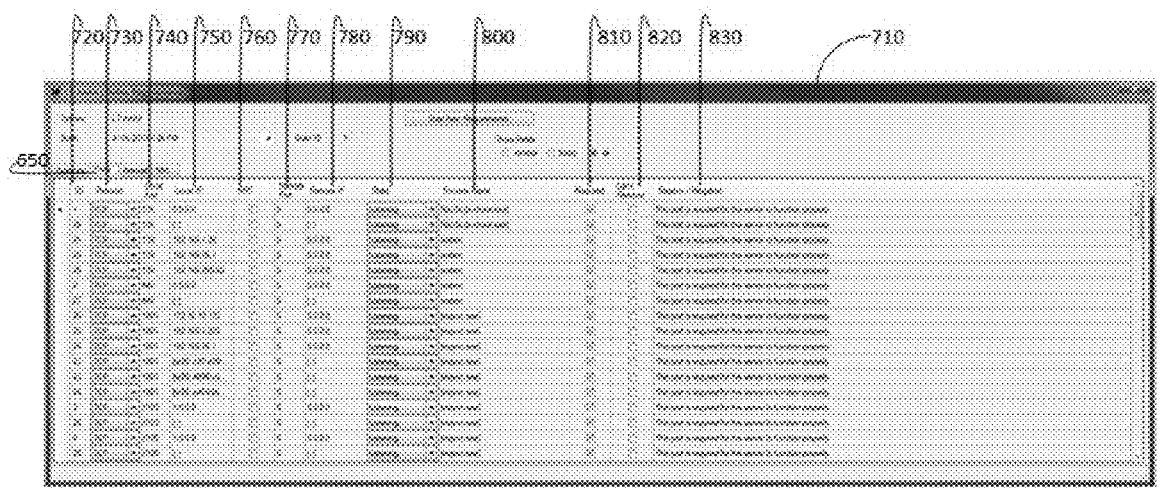
FIG. 10 is a screenshot showing a non-limiting example of a Define Requirements screen of an embodiment of a Graphical User Interface according to the invention wherein the Ports tab is open and all fields are shown.
Figure 11:
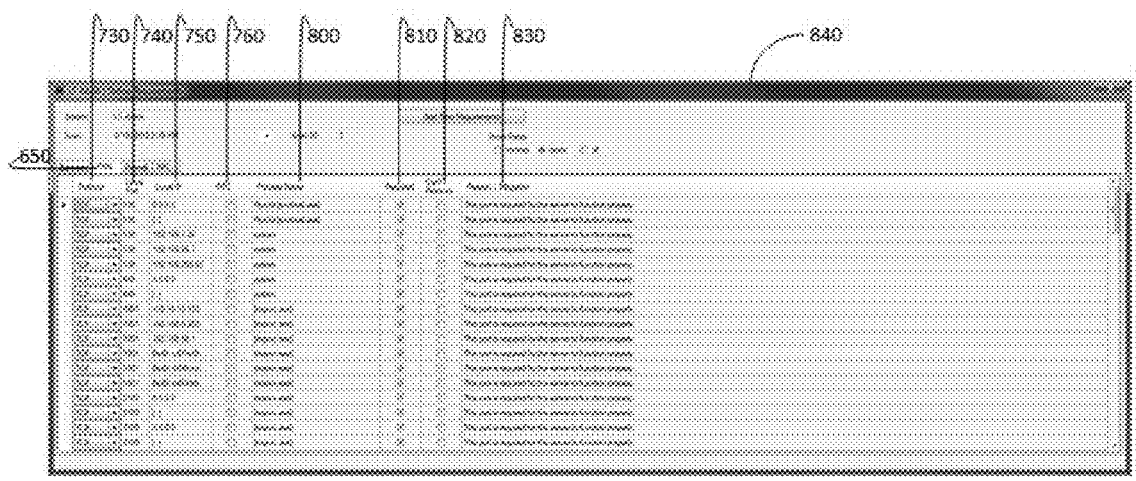
FIG. 11 is a screenshot showing a non-limiting example of a Define Requirements screen of an embodiment of a Graphical User Interface according to the invention wherein the Ports tab is open and basic fields are shown.
Figure 12:
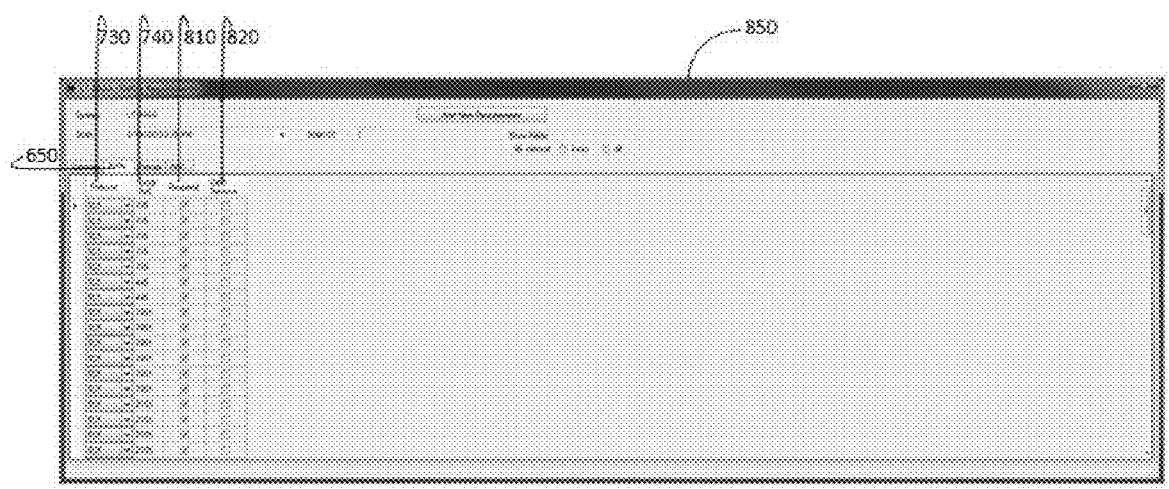
FIG. 12 is a screenshot showing a non-limiting example of a Define Requirements screen of an embodiment of a Graphical User Interface according to the invention wherein the Ports tab is open and minimal fields are shown.

FIG. 10 shows a non-limiting example of the Define Requirements screen 710 shown with the Ports tab 650 open so that ports may be defined, showing the results of the displayed scan for ports. All fields for defining requirements for ports are shown, which may appear in columns, and which may include ID 720, Protocol 730, which may be a pull-down menu as shown, Local Port 740, Local IP 750, RPC 760, which may be a checkbox as shown, Remote Port 770, Remote IP 780, State 790, which may be a pull-down menu as shown, Process Name 800, Required 810, which may be a checkbox as shown to allow a user to define ports that are required, Can't Remove 820, which may be a checkbox as shown to allow a user to define ports that can't be removed, and Reason/Mitigation 830, which may be a text field as shown which may provide for proper documentation. In addition, other embodiments of the Ports tab 650 screen may include a screen where only basic fields are shown, as shown in the non-limiting example of FIG. 11. The Ports basic screen 840 may include a subset of the fields shown in FIG. 10, such as Protocol 730, Local Port 740, Local IP 750, RPC 760, Process Name 800, Required 810, Can't Remove 820, and Reason/Mitigation 830. Further, other embodiments may include a Ports tab 650 screen where only minimal fields are shown, as shown in the non-limiting example of FIG. 12. The Ports minimal screen 850 may include a smaller subset of fields, such as Protocol 730, Local Port 740, Required 810, and Can't Remove 820. The various Ports screens 710, 840, 850 shown in FIGS. 10-12 which show different numbers of fields may be displayed through a simple radio button.

Figure 13:
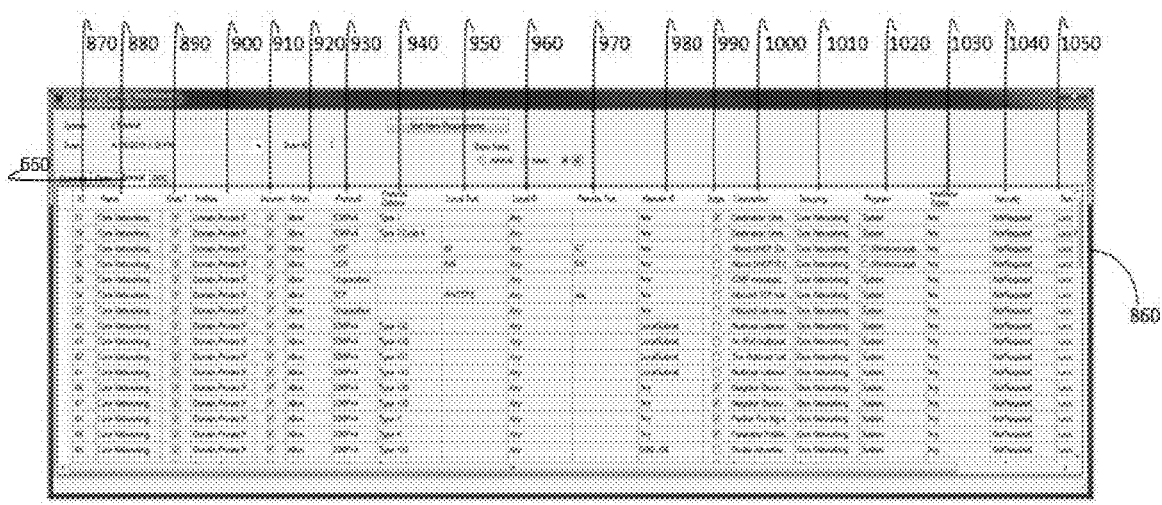
FIG. 13 is a screenshot showing a non-limiting example of a Define Requirements screen of an embodiment of a Graphical User Interface according to the invention wherein the Firewall tab is open and all fields are shown.
Figure 14:
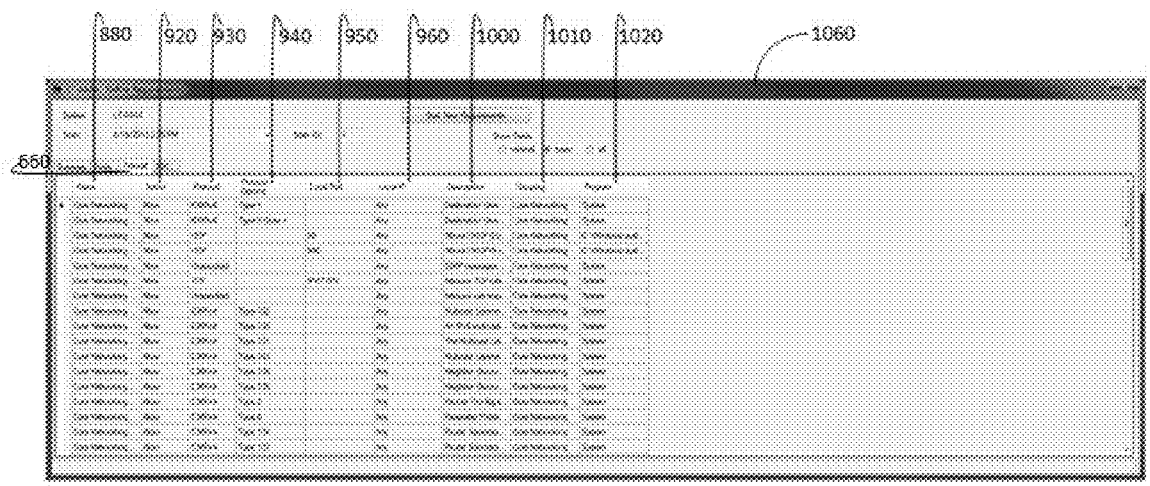
FIG. 14 is a screenshot showing a non-limiting example of a Define Requirements screen of an embodiment of a Graphical User Interface according to the invention wherein the Firewall tab is open and basic fields are shown.
Figure 15:
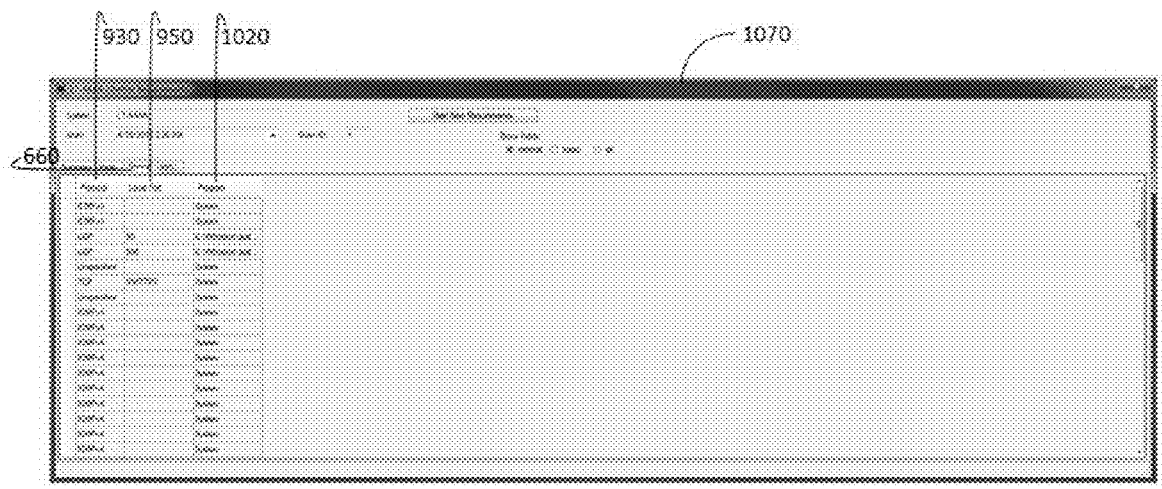
FIG. 15 is a screenshot showing a non-limiting example of a Define Requirements screen of an embodiment of a Graphical User Interface according to the invention wherein the Firewall tab is open and minimal fields are shown.

FIG. 13 shows a non-limiting example of the Define Requirements screen 860 shown with the Firewall tab 660 open so that firewall settings may be defined, showing results for the displayed scan for firewall settings. All fields for defining requirements are shown, which may appear in columns, which may include ID 870, Name 880, Enable 890, which may be a checkbox as shown to allow a user to enable a particular firewall setting, Profiles 900, Incoming 910, which may be a checkbox as shown which may allow a user to define a firewall setting as incoming, Action 920, Protocol 930, Protocol Options 940, Local Port 950, Local IP 960, Remote Port 970, Remote IP 980, Edge 990, which may be a checkbox as shown, Description 1000, which may be a text field as shown to allow a user to provide proper documentation, Grouping 1010, Program 1020, Interface Types 1030, Security 1040, and Rule 1050. In addition, other embodiments of the Firewall tab 660 screen may include a screen where only basic fields are shown, as shown in the non-limiting example of FIG. 14. The Firewall basic screen 1060 may include a subset of the fields shown in FIG. 13, such as Name 880, Action 920, Protocol 930, Protocol Options 940, Local Port 950, Local IP 960, Description 1000, Grouping 1010, and Program 1020. Further, other embodiments may include a Firewall tab 660 screen where only minimal fields are shown, as shown in the non-limiting example of FIG. 15.

The Firewall minimal screen 1070 may include a smaller subset of fields, such as Protocol 930, Local Port 950, and Program 1020. The various Firewall screens 860, 1060, 1070 shown in FIGS. 13-15 which show different numbers of fields may be displayed through a simple radio button.

Figure 16:
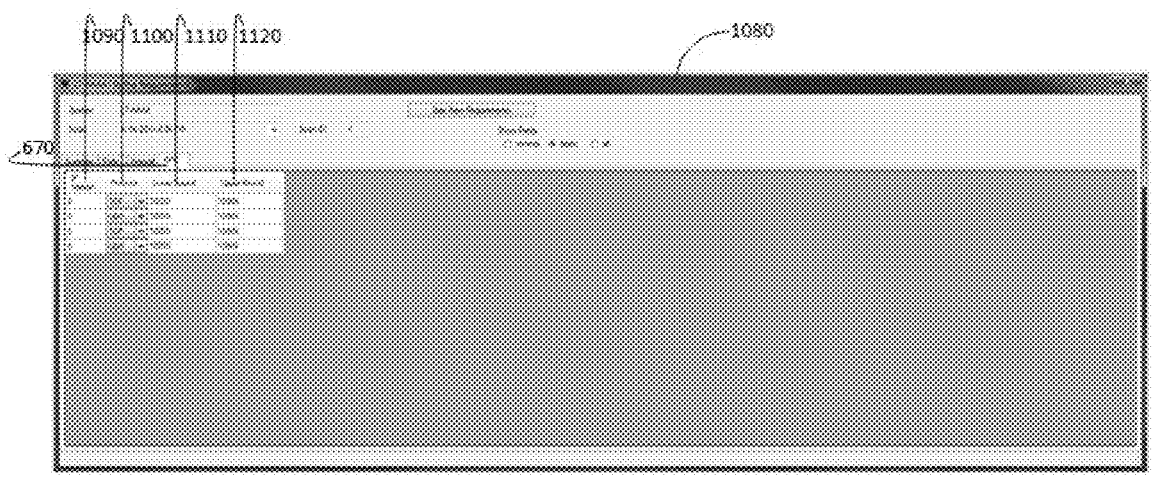
FIG. 16 is a screenshot showing a non-limiting example of a Define Requirements screen of an embodiment of a Graphical User Interface according to the invention wherein the RPC tab is open.

FIG. 16 shows a non-limiting example of the Define Requirements screen 1080 shown with the RPC tab 670 open so that RPC settings may be defined, showing results of the displayed scan. Basic fields for defining requirements are shown, which may appear in columns, which may include IP Version 1090, Protocol 1100, which may be pull-down menu as shown, Lower Bound 1110, and Upper Bound 1120.

Figure 17A:
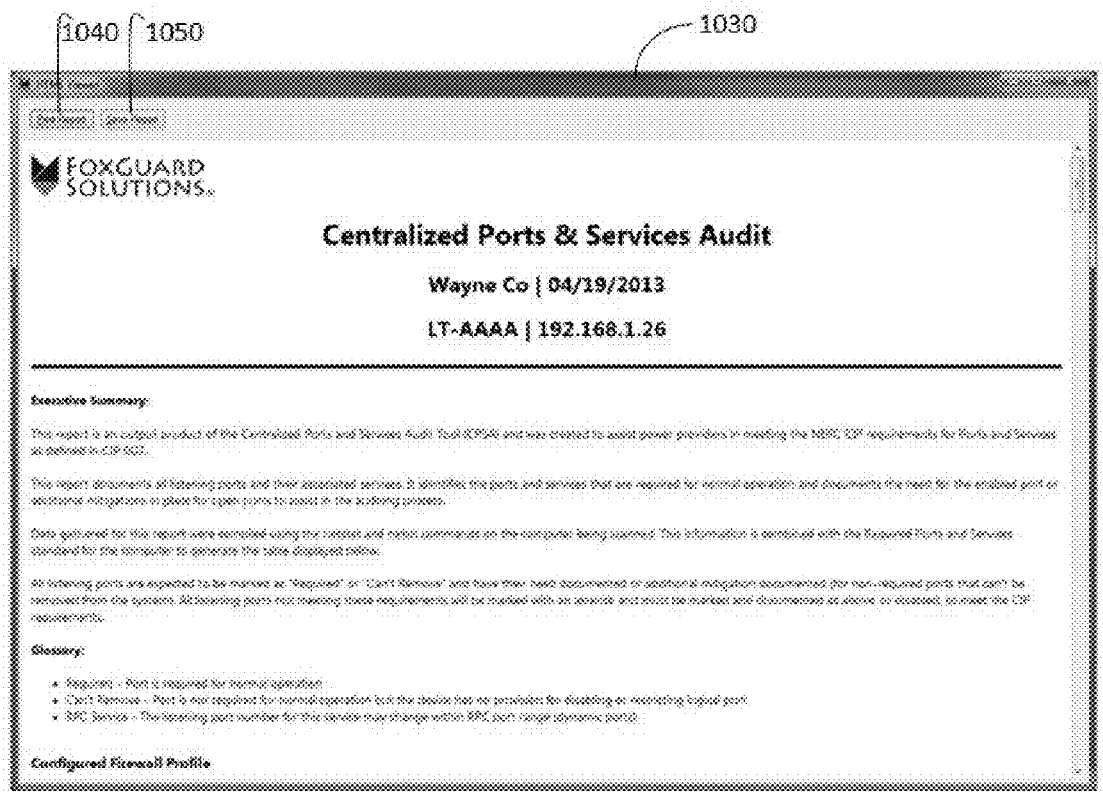

Upon clicking the View Last Report button 510 on the Main Form 400, a report screen 1030 for a ports and services audit may be displayed as shown in FIGS. 17A and 17B. The Report Screen 1030 may include a Print Report button 1040 and a Save Report button 1050. The Report may include various sections such as an Executive Summary, Glossary, Configured Firewall Profile, and a list of Ports and Services that are required and their documentation.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Other embodiments of the invention will be apparent to those skilled in the art from consideration of the specification and practice of the invention. For example, variations of the process steps and the GUI described and illustrated herein that are within the scope of the invention will be readily apparent. The description of the invention provided is merely exemplary in nature and, thus, variations that do not depart from the essence of the invention are intended to be within the scope of the invention.

APPENDIX

Midwest Reliability Organization
NERC CIP Compliance
http://www.midwestreliability.org/04_standards/CIP-002_thru_CIP-009_ver_3_MRO_CIP_SME_White_Paper_08-31-11.pdf
Page 29
CIP-005-3 R2 Electronic Access Controls
"A generic list of all open ports and services will be insufficient to meet R2.2. Don't forget to document the "configuration of ports and services" The stack of evidence for compliance may include any combination or all of the following:
  A list of "required" ports and services, which may be based on a blend of actual documentation from the vendor and narratives from the internal system administrators explaining the necessity of each required port/service
  Actual lists generated from the firewalls that include comments on each open port.
  The actual scan of the open/enabled ports and services"
Pages 45-46
CIP-007-3 R2 Ports and Services
  "Documentation should clearly identify the specific steps used to verify ports and services. How are "required" ports and services identified and documented? By what mechanisms and using what tools are open ports and enabled services obtained from each device? Does that method vary based on the type of device or within certain ESPs?
  Required ports and services will likely vary for each cyber asset or type of cyber asset. The documentation for this requirement will be more than just one simple list. For each device, document the required ports and services and why each one is necessary. Required ports can be documented in a range, if vendor or operational documentation will justify the need.
  Your ports and services documentation should address the inclusion or exclusion of enabled services that do not require a port.
  Ports and services can be considered "required" even if they are not in use. It is acceptable to allow the inclusion of emergency operations and anything that can be constituted as operationally necessary by the entity or the vendor.
  For the annual verification, the entire list of "required" ports and services does not have to be open or enabled at the time of the scan. A discrepancy is only noted if extra ports and services not included in the "required" list are open or enabled.
  TIP: Maintain a baseline list of existing ports and services and record any changes that occur. When ports or services are no longer required, review access point controls to deny that port access to the ESP.
  Make sure unnecessary ports and services are disabled before any asset is implemented.
  If a port is not used but cannot be disabled, ensure the port is not accessible through the ESP access point, as one of the compensatory measures.
  TIP: Port scanners, if successfully implemented, can be used to automate the process of determining what ports are open. The success of this will depend heavily on the specific configuration of the environment, so use extreme caution and careful evaluation by a highly qualified expert is necessary.
CIP-007-3 R2 Evidence Considerations:
  Procedures for the controls in place ensuring only required ports and services are open/enabled
    Device by device list of required ports and services
    Evidence/scans that demonstrate only those ports and services are open"
IRM TRMR-47
Appendix A
Reclamation Manual
Directives and Standards
http://www.usbr.gov/recman/temporary_releases/irmtrmr-47-AppA.pdf
Pages A1-A2
Ports and Impact Analysis Testing
1. Introduction. This document provides requirements for determining minimal ports and services for cyber assets subject to the North American Reliability Corporation (NERC) Critical Infrastructure Protection (CIP) Reliability Standards.
2. Ports and Services. The requirements for enabling only those ports and services that are necessary for normal and emergency operations are addressed in CIP 005-R2.2 for access points into the Electronic Security Perimeter (ESP) and in CIP 007-R2 for all cyber assets subject to the NERC CIP Reliability Standards. Compliance with the above referenced requirements also includes documenting the rationale and justification for enabling or disabling ports and services, as well as, identifying any compensating measures applied to mitigate the risk exposure where the unnecessary ports and services cannot be disabled due to technical limitations of the configuration capability of the cyber asset.

A. Step 1: Determining Baseline Configurations. While a minimal set of ports and services are required for an operating system, additional ports and services may be necessary to support the function of the server, workstation, or personal computer. Hosted applications such as iFIX and database applications such as Oracle will require additional ports and services in addition to those that support the operating system alone. Vendor documentation and Security Technical Implementation Guides provide information to initially identify minimum ports and services. However, functional testing will be necessary to ensure that the operating system and hosted applications function properly after disabling all unnecessary ports and services. Internet Protocol (IP) enabled industrial assets such as Programmable Logic Controllers (PLCs) and protection relays identified as critical cyber assets (CCA) require testing and interaction with the vendor to determine the baseline configuration. While these devices require specific ports and services for operations, they typically include a broad set of capabilities for configuration. It is not uncommon for these devices to have telnet, HTTP, and SNMP ports open for remote access. In these situations, operational decisions are necessary to determine which ports and services will be primary or needed for emergency access, and which ones must be disabled.

B. Step 2: Documenting the Baseline. Once all testing and research activities associated with Step 1 are completed, the authorized ports and services must be documented. System administrators must document and maintain the system ports and services baseline. The documentation must also identify known vulnerabilities for services with a high potential for security control failure that could not be disabled. This activity will support the mapping of compensating measures to be identified in Step 3. An inventory for each CCA must be maintained that clearly lists:

(1) the necessary ports and services,
(2) ports and services that have been enabled (where this may vary from necessary ports and services), and
(3) if applicable, those ports and services that cannot be disabled due to technical limitations.

C. Step 3: Implementing and Identifying Compensating Measures. CIP 007-R2.3 requires that in cases where unused ports and services cannot be disabled due to the technical limitations, compensating measures applied to mitigate the risk of exposure must be documented accordingly. An example of a compensating measure for ports that cannot be disabled includes the use of firewalls and routers at the access points to restrict communication to those ports from outside the ESP boundary. An electronic monitoring capability for detecting unnecessary network traffic is also recommended as a compensating measure. The documentation shall include the mapping of all unnecessary ports and services, services with known high risk vulnerabilities and exploits, and the related compensating measures implemented to mitigate the risk of exposure. The documentation produced may be utilized in the creation of a Technical Feasibility Exception associated with ports and services that cannot be disabled for a particular asset.

The invention claimed is:

1. A method of complying with computer network security requirements comprising:
   a. Identifying network security risks by scanning one or more device in a network for network security risks selected from open sockets, open ports, running services, and firewalls settings via a scanner operably configured to identify such network security risks;
   b. Refining the set of network security risks to those requiring documentation via software operably configured for refining the set of network security risks by:
      i. Removing all open sockets currently part of an established network connection;
      ii. Removing all sockets only accessible from a local host;
      iii. Identifying and marking open sockets with a non-static source port; and
      iv. Identifying and grouping services that use multiple listening ports;
   c. Creating documentation on the network security risks via documentation software operably configured for creating documentation on necessity of the network security risks; and
   d. Creating a report of the network security risks and documentation via reporting software operably configured for creating a report that identifies ports and services that have not been adequately documented according to the network security requirements, wherein the report identifies ports and services that have not been adequately documented according to the network security requirements.

2. The method of claim 1, wherein the documentation is created through use of text fields, check boxes, and pull-down menus.

3. The method of claim 1, wherein groups of ports and services are documented with reference information based on device use criteria.

4. The method of claim 1, wherein the scanning is performed as a non-intrusive port scan.

5. The method of claim 1, wherein the scanning is employed across platforms selected from Microsoft®, MacOS®, Linux®, NetBSD, FreeBSD, and Solaris® operating systems.

6. The method of claim 1, wherein the scanning is performed without installation of files on a scanning computer.

7. A method of complying with computer network security requirements comprising:
   a. Identifying a set of network security risks on a network device;
   b. Storing the set of network security risks in a dataset;
   c. Comparing the dataset of network security risks to baseline system requirements of the network device;
   d. Creating a report to display network security risks not included in the baseline system requirements of the network device; and
   e. Mitigating risk of the network security risks not included in the baseline system requirements of the network device by refining the set of network security risks by:
      i. Removing all open sockets currently part of an established network connection;
      ii. Removing all sockets only accessible from a local host;
      iii. Identifying and marking open sockets with a non-static source port; and
      iv. Identifying and grouping services that use multiple listening ports.

8. The method of claim 7, wherein the network security risks are identified through a scan of the network device and are selected from open ports, running services, or firewall settings.

9. The method of claim 7, wherein the mitigating comprises determining if a port or service is a required port or service for operation of the network device, and if required:

a. Selecting groups of ports or services from the ICS System Knowledge Manager;

b. Selecting the scanned device from the ICS System Knowledge Manager.

10. The method of claim 7, wherein the mitigating comprises determining if a port or service is a required port or service for operation of the network device, and if required:

a. Manually editing individual ports or service documentation; and b. Adding the required port or service to the baseline system requirements of the network device.

11. The method of claim 7, wherein the mitigating comprises determining if a port or service is a required port or service for operation of the network device, and if the port or service is not a required port or service, manually disabling the not required ports or services or mitigating through the use of a firewall, router, or electronic monitor.

12. The method of claim 7, wherein the network security requirements are determined by North American Electric Reliability Corporation (NERC) standards.

13. A system for complying with network security requirements comprising:

a. A scanner operably configured for identifying network security risks of an electronic device in a network, wherein the risks are selected from open sockets, open ports, running services, and firewalls settings;

b. Software operably configured for refining the set of network security risks by
   i) removing all open sockets part of an established network connection,
   ii) removing all sockets only accessible from a local host,
   iii) identifying and marking open sockets with a source port that is non-static, and
   iv) identifying and grouping services that use multiple listening ports;

c. Documentation software operably configured for creating documentation on necessity of the network security risks; and d. Reporting software operably configured for creating a report that identifies ports and services that have not been adequately documented according to the network security requirements.

14. The system of claim 13, wherein the reporting software is operably configured to provide a report that identifies relevant firewall rules associated with open ports.

15. The system of claim 13, wherein the scanner is operably configured to allow for a scan to be performed as a non-intrusive port scan.

16. The system of claim 13, wherein the scanner is operably configured to allow for a scan to be employed across platforms selected from Microsoft®, MacOS®, Linux®, NetBSD, FreeBSD, and Solaris® operating systems.

17. The system of claim 13, wherein the scanner is operably configured to allow for a scan to be run without installation of files on a scanning computer.

18. The system of claim 13, wherein the scanner is operably configured to allow for a scan to be performed on a local computer using one or more of netstat, sc query, and netsh commands.

19. The system of claim 13, wherein the network security requirements are determined by North American Electric Reliability Corporation (NERC) standards.

20. A method of complying with computer network security requirements comprising:

a. Identifying network security risks by scanning one or more device in a network for network security risks selected from open sockets, open ports, running services, and firewalls settings;

b. Refining the set of network security risks to those requiring documentation;

c. Creating documentation on the network security risks; and d. Creating a report of the network security risks and documentation, wherein the report identifies ports and services that have not been adequately documented according to the network security requirements;

wherein the refining comprises:
   i. Removing all open sockets currently part of an established network connection;
   ii. Removing all sockets only accessible from a local host;
   iii. Identifying and marking open sockets with a non-static source port; and
   iv. Identifying and grouping services that use multiple listening ports.

* * * * *